(12) United States Patent
Royals

(10) Patent No.: US 8,985,061 B2
(45) Date of Patent: Mar. 24, 2015

(54) ANCHOR SYSTEM

(71) Applicant: Cedar Industries, Inc., Pierce, CO (US)

(72) Inventor: Michael Anthony Royals, Pierce, CO (US)

(73) Assignee: Cedar Industries, Inc., Pierce, CO (US)

( * ) Notice: Subject to any disclaimer, the term of this patent is extended or adjusted under 35 U.S.C. 154(b) by 126 days.

(21) Appl. No.: 13/939,837

(22) Filed: Jul. 11, 2013

(65) Prior Publication Data

US 2015/0013620 A1   Jan. 15, 2015

(51) Int. Cl.
*A01K 1/04* (2006.01)

(52) U.S. Cl.
USPC ............ 119/786; 52/157

(58) Field of Classification Search
USPC ............ 119/786, 787, 788, 789, 791; 52/155, 52/157
See application file for complete search history.

(56) References Cited

U.S. PATENT DOCUMENTS

| | | |
|---|---|---|
| 911,504 A | 2/1909 | Jay |
| 1,103,723 A | 7/1914 | Witte |
| 1,250,597 A | 12/1917 | Kyle |
| 1,491,203 A | 4/1924 | Enoch |
| 2,297,118 A * | 9/1942 | Wildegans .................. 473/147 |
| 2,343,350 A | 3/1944 | Warren |
| 2,643,843 A | 6/1953 | Brown |
| D313,471 S | 1/1991 | Bremer et al. |
| 5,059,077 A | 10/1991 | Schmid |
| 5,207,404 A | 5/1993 | Reinhard |
| 5,252,016 A | 10/1993 | Schmid et al. |
| 5,457,918 A | 10/1995 | Plourde |
| 5,606,832 A | 3/1997 | Keith et al. |
| 5,662,304 A | 9/1997 | McDaniel |
| 5,691,056 A | 11/1997 | Vandyk |
| 5,809,700 A | 9/1998 | Roush et al. |
| D407,173 S * | 3/1999 | Marshall .................. D30/124 |
| 6,213,054 B1 * | 4/2001 | Marshall .................. 119/57.8 |
| 6,349,514 B1 | 2/2002 | Adams |
| 6,490,997 B1 * | 12/2002 | Biermann et al. .......... 119/706 |
| 6,846,142 B2 | 1/2005 | Gens |
| D550,072 S | 9/2007 | Ardern |
| 7,410,137 B2 | 8/2008 | Diggle et al. |
| 8,182,371 B2 * | 5/2012 | Norman .................. 473/417 |
| 2004/0216697 A1 * | 11/2004 | Wojcik et al. ............. 119/786 |
| 2005/0145182 A1 * | 7/2005 | Marshall .................. 119/57.8 |

(Continued)

FOREIGN PATENT DOCUMENTS

WO   WO 2007/056586   5/2007

OTHER PUBLICATIONS

Smarthome, SUREswivel SS-100 Tangle-free Pet Anchor and Dog Leash Tether product webpage, www.smarthome.com, downloaded Jul. 9, 2013, 2 pages.

(Continued)

*Primary Examiner* — Yvonne Abbott

(74) *Attorney, Agent, or Firm* — Craig R. Miles; CR Miles, P.C.

(57) ABSTRACT

An anchor in including a cylindrical member having a helical thread which can be advanced into an anchoring material and a tether restraint element having a configuration adapted to guide movement of a tether end movably coupled to said tether restraint toward a position on said tether restraint which directs forces transmitted to the tether restraint element from said tether end in a direction capable of rotationally advancing the elongate cylindrical member into the anchoring material.

22 Claims, 3 Drawing Sheets

(56) References Cited

U.S. PATENT DOCUMENTS

2007/0113491 A1    5/2007  Royals
2008/0000430 A1*   1/2008  Petersen ..................... 119/786
2011/0005148 A1*   1/2011  Foster ........................... 52/157

OTHER PUBLICATIONS

PPL Motor Homes, Spiral Achors for RV Awnings product webpage, www.pplmotorhomes.com, downloaded Jul. 9, 2013, 2 pages.

* cited by examiner

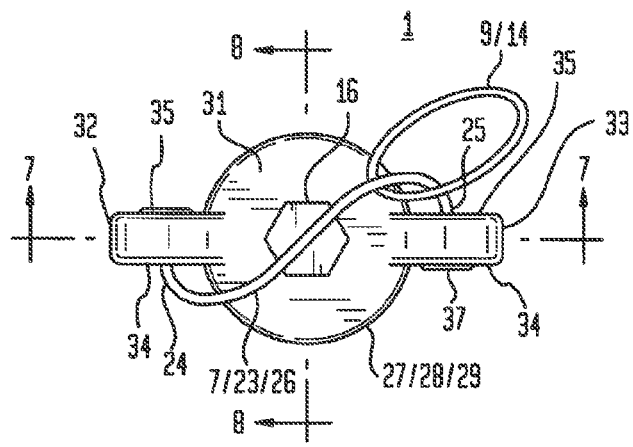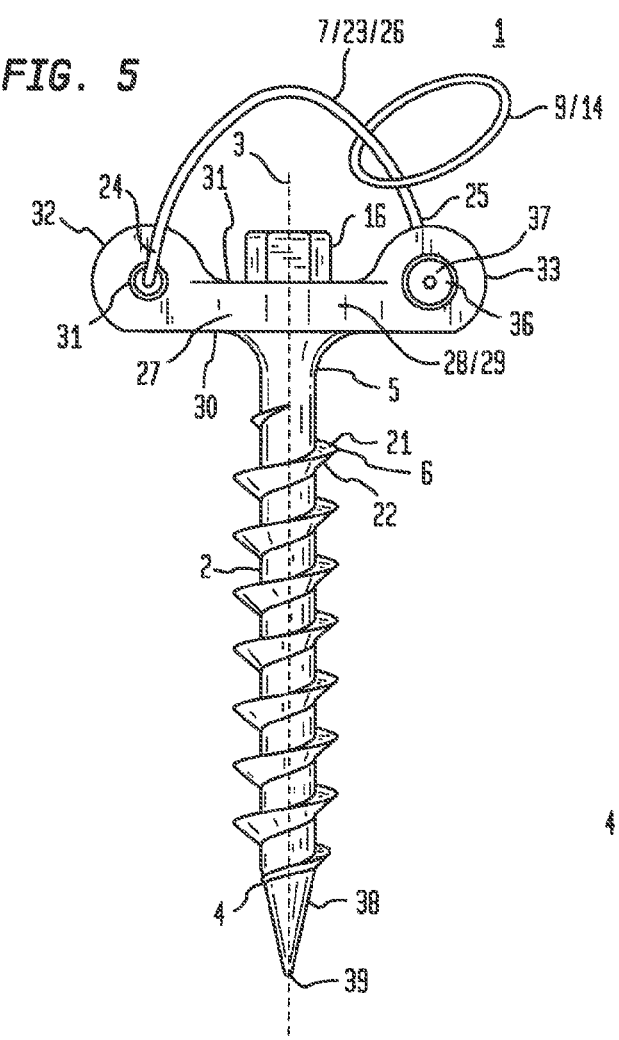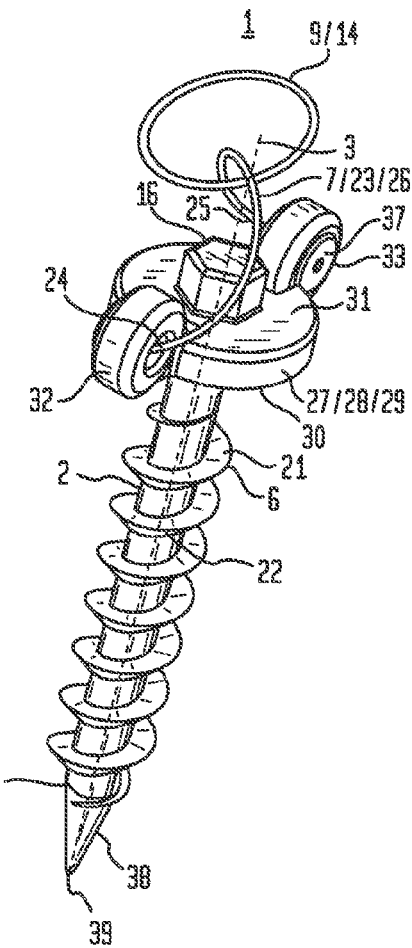

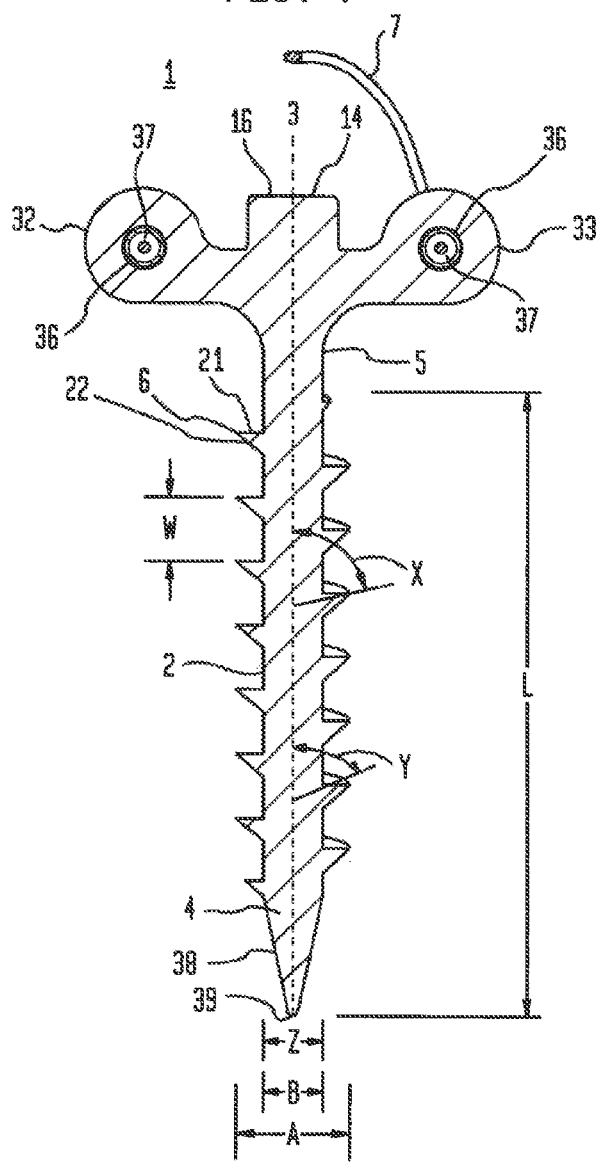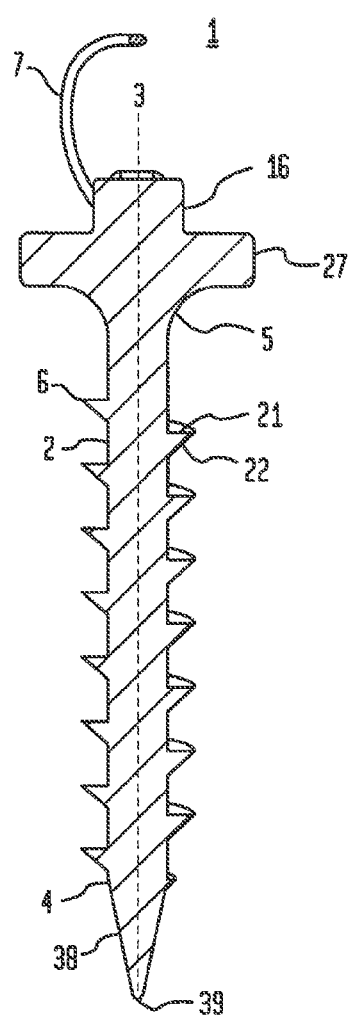

ANCHOR SYSTEM

I. TECHNICAL FIELD

An anchor including a cylindrical member having a helical thread which can be advanced into an anchoring material and a tether restraint element having a configuration adapted to guide movement of a tether end movably coupled to said tether restraint toward a position on said tether restraint which directs forces transmitted to the tether restraint element from said tether end in a direction capable of rotationally advancing the elongate cylindrical member into the anchoring material.

II. BACKGROUND

Conventional anchors useful in tethered restraint of animals or movable objects may include a body configured to advance into an anchoring material by rotation in a first direction and to retreat from the anchoring material by rotation in a second direction depending on the handedness of the body configuration. For example, a right handed configuration advances into an anchoring material when rotated clockwise and retreats when rotated counterclockwise.

A disadvantage of an anchor which exhibits handedness may be that during tethered restraint of an animal or a moving object the forces transmitted from the tether to the anchor by movement of the animal or moving object can cause the anchor to retreat from the anchoring material.

II. SUMMARY OF THE INVENTION

Accordingly, a broad object of the invention can be to provide an anchor which can be advanced by rotation into an anchoring material which includes a tether restraint element adapted to guide a movably coupled tether toward a position on the anchor which directs forces to rotationally advance the anchor into an anchoring material.

Naturally, further objects of the invention may be disclosed throughout other areas of the specification, drawings, and claims.

III. A BRIEF DESCRIPTION OF THE DRAWINGS

Figure 1:
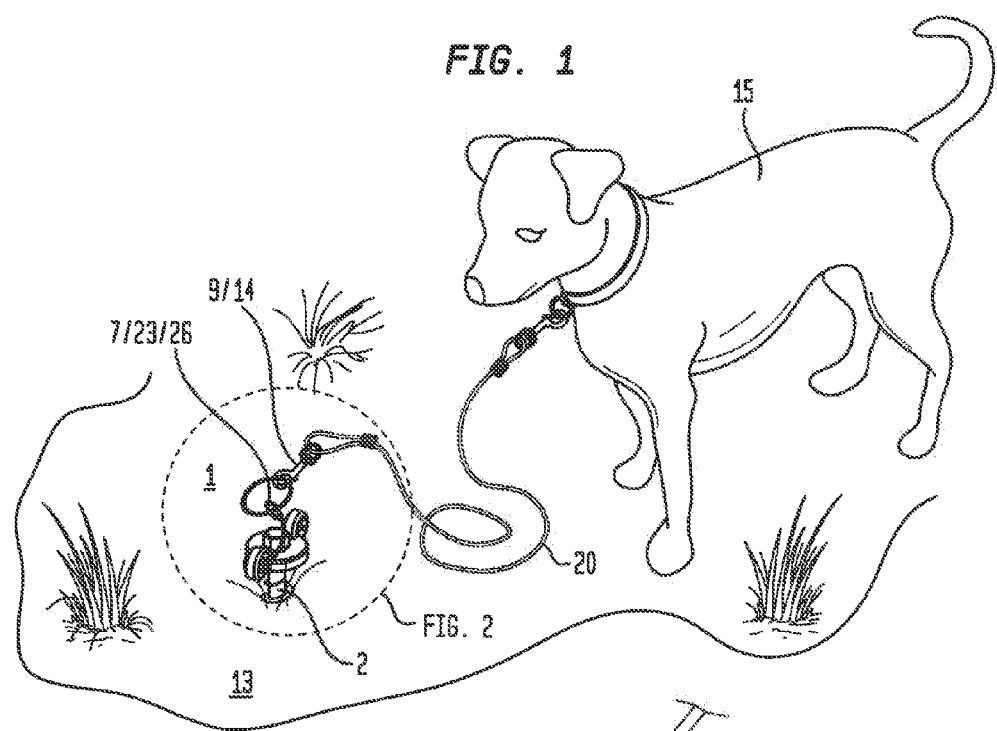

FIG. 1 provides an illustration of how to use a particular embodiment of the inventive anchor to tether an animal.

Figure 2:
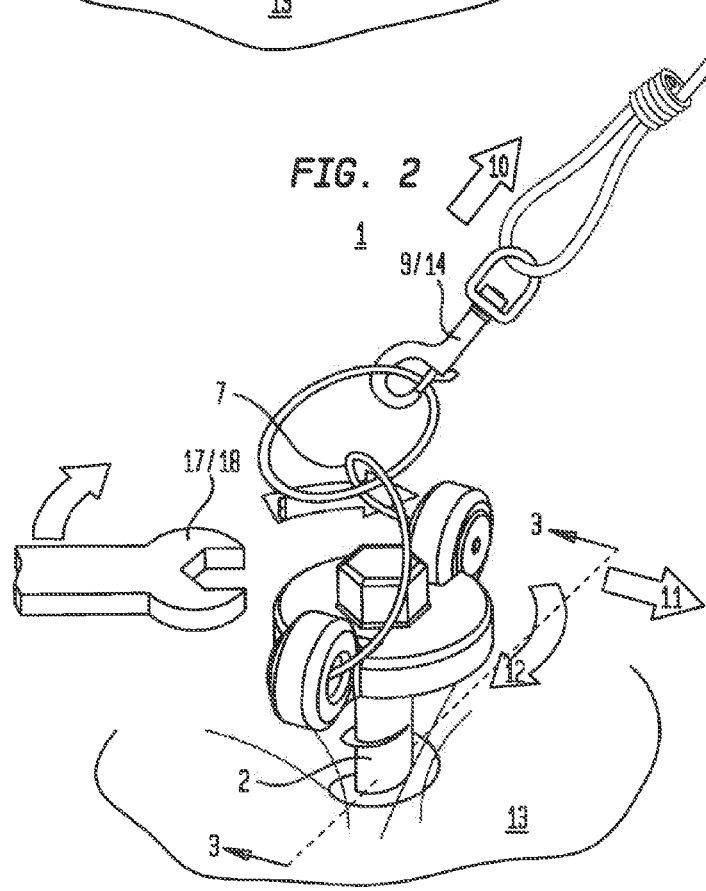

FIG. 2 provides an enlarged view of a portion of FIG. 1 which illustrates how to use a particular embodiment of the anchor invention to tether an animal.

Figure 3:
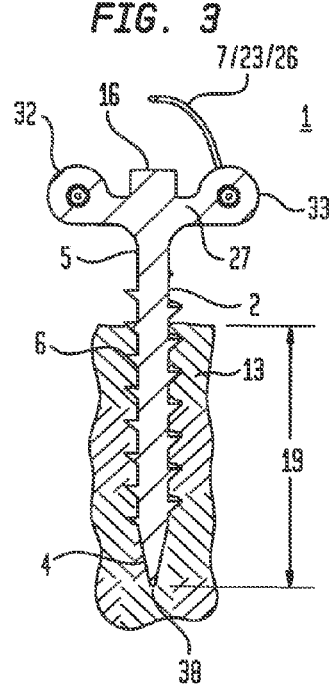

FIG. 3 provides a cross section 3-3 shown in FIG. 2 view of a particular embodiment of the invention.

FIG. 4 provides a top view of a particular embodiment of the anchor invention.

FIG. 5 provides a side view of a particular embodiment of the anchor invention.

FIG. 6 provides an isometric view of a particular embodiment of the anchor invention.

FIG. 7 provides a cross section 7-7 shown in FIG. 4 of a particular embodiment of the anchor invention.

FIG. 8 provides a cross section 8-8 shown in FIG. 4 of a particular embodiment of the anchor invention.

IV. DETAILED DESCRIPTION OF THE PREFERRED EMBODIMENTS

An anchor in including a cylindrical member having a helical thread which can be advanced into an anchoring material and a tether restraint element having a configuration adapted to guide movement of a tether end movably coupled to said tether restraint toward a position on said tether restraint which directs forces transmitted to the tether restraint element from said tether end in a direction capable of rotationally advancing the elongate cylindrical member into the anchoring material.

Referring primarily to FIGS. 1 through 8, a particular method of using the inventive anchor (1) includes obtaining an anchor (1) including a cylindrical member (2) having a longitudinal axis (3) which passes through a member first end (4) and a member second end (5), a helical thread (6) coupled to the cylindrical member (2), and a tether restraint element (7) coupled proximate the member second end (5).

Now referring primarily to FIG. 2, the tether restraint element (7) can have a configuration adapted to guide movement (8) of a tether end (9) movably coupled to said tether restraint element (7) toward a position on the tether restraint element (7) which directs forces (10) transmitted to the tether restraint element (7) from the tether end (9) in a direction of force (11) capable of rotationally advancing (12) the anchor (1) into an anchoring material (13).

Now referring primarily to FIGS. 1 through 3, the member first end (4) can be engaged with the anchoring material (13), and by rotating the anchor (1), the anchor (1) can be advanced into the anchoring material (13). The term "anchoring material" for the purposes of this invention means any material into which the anchor (1) can be advanced by rotating engagement of the helical thread (6) in the material and without limiting the breadth of the forgoing includes as illustrative examples: the earth, the ground, a soil, gravel, sod, a baled, compressed, or otherwise contained material, such as, hay, alfalfa, wheat grass, cotton, crop residue, cellulose fiber, a synthetic fiber such as polyester fiber, a polypropylene fiber, a nylon fiber, or the like, or combinations thereof.

Now referring primarily to FIG. 1, the particular method of using the inventive anchor (1) can further comprise movably coupling a tether first end (14) to said tether restraint element (7), and tethering an animal (15) (or other object) to a tether second end (16). The term "animal" means for the purpose of this invention means any tetherable animal and without limiting the breadth of the forgoing includes as illustrative examples: dogs (as shown in the example of FIG. 1), cats, birds, rodents, amphibians, reptiles, or the like; however, other objects can be tethered by a tether (20) to the tether restraint element (7) including as illustrative examples: cycles, carts, wagons or barrows, measuring devices, or the like.

Now referring primarily to FIGS. 1-8, the particular method can further comprise obtaining a particular embodiment of the invention further including a rotor receiving element (16) coupled to said member second end (5) of said cylindrical member (2). The rotor receiving element (16) can be adapted to fit a rotor (17) operable to rotate said anchor (1). By fitting the rotor (17) to the rotor receiving element (16), the anchor (1) can be rotated by operation of the rotor (17). The term "rotor" for the purposes of this invention means a device that can be coupled, connected, engaged, or mated (whether removably, fixedly, slidely, frictionally, or otherwise) to the rotor receiving element (16) capable of generating rotation of the cylindrical member (2) about the longitudinal axis (3) and without limiting the breadth of the foregoing includes: a lever, a wrench (18) (as shown in the example of FIG. 2), tire iron, lug wrench, a socket, a motor (whether driven by electricity, gas, compressed air, compressed liquid, or other energy source), or the like, or combinations thereof.

Similarly, the rotor receiving element (16) while shown in the Figures as a hexagonal extension of the cylindrical member (2), the rotor receiving element (16) can be configured in any manner which can be coupled, connected, engaged, or mated (whether removably, fixedly, slidely, frictionally, or otherwise) to the rotor (17) including as illustrative examples: a triangular, rectangular, pentagonal, hexagonal, or other polygonal portion or extension of the cylindrical member (2) (or other component of the invention as described below).

Now referring primarily to FIG. 3, the anchor (1) can be rotated to advance the cylindrical member (2) a distance (19) into the anchoring material (13). The distance (19) can be sufficient to secure the anchor (1) in the anchoring material (13) depending upon the application. As shown in the example of FIG. 3, only a part of the cylindrical member (2) has been advanced into the anchoring material (13) which can be sufficient for tethering particular animals (15); however, the cylindrical member (2) can be advanced into the anchoring material (13) to a greater or lesser extent depending upon the configuration of the cylindrical member (2), the characteristics of the anchoring material (13), and the animal or other object to be tethered.

Now referring primarily to FIGS. 3 through 8 an illustrative embodiment of the inventive anchor (1) is shown. As to particular embodiments the inventive anchor can include a cylindrical member (2) having a longitudinal axis (3) which passes through a member first end (4) and a member second end (5). A helical thread (6) can be coupled to the cylindrical member (2). A tether restraint element (7) can be coupled proximate said member second end (5).

Now referring primarily to FIG. 7, the anchor (1) can include a cylindrical member (2) having a cylindrical member diameter "B" which can as to particular embodiments be a diameter of between about three eights inch and about five eights inch; however, this illustrative example is not intended to limit other embodiments to a greater or lesser diameter "B" depending up on the application. As to particular embodiments of the cylindrical member (2) having a cylinder diameter "B" of between about three eights inch and about five eights inch, the cylindrical member can have a cylinder member length "L" of between about five inches and twelve inches; however, this illustrative example is not intended to limit other embodiments to a greater or lesser length "L" depending up on the application. The cylindrical member (2) can be generated from a numerous and wide variety of materials such as metal, stainless steel, aluminum, plastic, nylon, polyethylene, polypropylene, acrylic, vinyl, or the like, or combinations thereof. Moreover, it is not intended that the member be limited to a solid member or a hollow member or further limited by any particular weight, volume, weight per volume, density, measure, or similar characteristic.

The term "thread" for the purpose of this invention means any thread configuration which can be coupled to the cylindrical member (2), whether directly or indirectly or as unitized component, capable of advancing the cylindrical member (2) into an anchoring material (13) by rotation of the cylindrical member (2).

As shown primarily by FIGS. 5 through 7, the thread (6) can comprise at least one helical thread (6) having a first helical thread surface (21) which faces away from the anchoring material (13) as the cylindrical member (2) advances into the anchoring material (13) and a second helical thread surface (22) which faces toward the anchoring material (13 as the cylindrical member (2) advances into the anchoring material (13).

As shown in the example of FIG. 7, the plane of the longitudinal axis (3) of the substantially cylindrical member (2) and the plane of the first helical thread surface (21) can join at an angle "X", As to certain embodiments of the invention, angle "X" can include an angle range of between about eighty degrees and about ninety degrees. As to other embodiments of the invention, angle "X" can be about ninety degrees, As to the second helical thread surface (22), the plane of the longitudinal axis (3) of the substantially cylindrical member (2) and the plane of the second helical thread surface (22) can join at an angle "Y". As to certain embodiments of the invention, angle "Y" can include a range of between about forty degrees and about fifty degrees. As to other embodiments of the invention, angle "Y" can be about forty five degrees. The thread pitch "W" can be a measure in the range of about three quarters to about one and one half the measure of the cylindrical member diameter "B" with certain embodiments of the invention having a thread pitch "W" having measure about equal to the member diameter measure "B". The internal thread diameter "Z" can be equal to the cylindrical member diameter "B" while the external thread diameter "A" can comprise a measure of between about one and one-half to two and one-half the measure of the cylindrical member diameter "B" with certain embodiments of the invention having an external thread diameter "A" of twice the cylindrical member diameter "B". As to those embodiments of the invention having a cylindrical member diameter "B" of about one-half inch the external thread diameter can be about one inch; however, the dimensional relations can be greater or lesser than the example of FIG. 7 depending upon the application.

Now referring primarily to FIGS. 4 through 6, the tether restraint element (7) can have a configuration adapted to guide a movably coupled tether end (9) toward a position on said tether restraint (7) which directs forces (10) transmitted to said tether restraint element (7) from said tether end (9) in a direction which acts to rotationally advance said cylindrical member into an anchoring material (13).

As to particular embodiments, the tether restraint element (7) can have a spiral restraint body (23) disposed between a restraint first end (24) and a restraint second end (25). The restraint first end (24) and said restraint second end (25) coupled in radial spaced apart relation about the longitudinal axis (3) of the cylindrical member (2) proximate said second member end (5) to dispose said spiral restraint body (23) over said member second end (5), As to particular embodiments the spiral restraint body (23) can be substantially rigid or have a substantially fixed configuration. As to these embodiments, the tether restraint element (7) can be formed, molded, or fabricated in in substantially fixed configuration from a metal or metal rod such as stainless steel or plastic such as polyethylene, polypropylene, polycarbonates, or the like or combinations or mixtures thereof.

As to particular embodiments, the spiral restraint body (23) can comprise a flexible line (26) having a spiral configuration generated by coupling of the restraint first end (24) and the restraint second end (25) in spaced apart relation about the longitudinal axis (3) of the cylindrical member (2). As these embodiments the tether restraint element (7) can be generated using flexible solid metal rod or metal wire, or a plurality of twisted or braided wires such as stainless steel or plastic such as polyethylene, polypropylene, polycarbonates, or the like or combinations or mixtures thereof capable of being positioned in a spiral configuration by coupling the restraint first end (24) and the restraint second end (25) in spaced apart relation about the longitudinal axis (3) of the cylindrical member (2).

Now referring primarily to FIGS. 4 through 6, embodiments can further include a member cap (27) coupled to the member second end (5). The member cap (27) can extend a distance outward of the cylindrical member (2) to a peripheral edge (28). The member cap (27) as to particular embodiments can be a substantially circular disk (29) having a first circular disk side (30) and a second circular disk side (31) which extend to a substantially circular peripheral edge (28). The first circular disk side (30) can be concentrically coupled to the member second end (5) of the substantially cylindrical member (2). The first circular disk side (30) coupled to the member second end (5) can provide a surface area which upon engagement with the anchoring material (13) provides sufficient resistance to further rotation of the substantially cylindrical member (2) about the longitudinal axis (3) which limits further advance of the substantially cylindrical member (2) into the anchoring material (13). Particular embodiments of the member cap (27) configured as a substantially circular disk (29) can have a diameter of between about one inch and about two inches and a thickness of between about one quarter inch and about one half inch, with particular embodiments of the substantially circular disk having a diameter of about one and one half inches and a thickness of about three eights inch.

As to particular embodiments of the invention having a member cap (27), the restraint first end (24) and said restraint second end (25) can be coupled in spaced apart relation about the circular peripheral edge (28) of said member cap (27) to dispose the spiral restraint body (23) over the member cap (27).

As to particular embodiments, the anchor (1) can further include a pair of flanges (32)(33) can be coupled in opposed relation to said member cap (27) proximate the peripheral edge (28). The pair of flanges can each be adapted to couple to a corresponding one of the restraint first end (24) or the restraint second end (25). The particular embodiment of the pair of flanges shown in the example of FIGS. 4-6, includes a pair of flanges (32)(33) coupled to the substantially circular disk (29), above-described, in substantially orthogonal relation to said member cap (27) with the pair of flanges (32)(33) each having a pair of flange sides (34)(35) disposed in opposed relation a distance apart and a bore (36) which communicates between said pair of flange sides (34)(35) adapted to retain the restraint first end (24) or retainer second end (25) within the bore (36). As to particular embodiments, a mechanical fastener (37) can be coupled to the retainer first end (24) or retainer second end (25) to retain each in a corresponding bore (36).

Now referring again primarily to FIGS. 5 and 6, embodiments of the anchor (1) can further include a tip (38) coupled to the member first end (4) which provides a tapered surface to provide a member first end terminal (39) having a configuration which reduces the amount of force to urge the substantially cylindrical member (2) into the anchoring material (13) to engage a portion of the thread (6).

As can be easily understood from the foregoing, the basic concepts of the present invention may be embodied in a variety of ways. The invention involves numerous and varied embodiments of an anchor and methods of making and using such anchor.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "anchor" should be understood to encompass disclosure of the act of "anchoring"—whether explicitly discussed or not —and, conversely, were there effectively disclosure of the act of "anchoring", such a disclosure should be understood to encompass disclosure of an "anchor" and even a "means for anchoring." Such alternative terms for each element or step are to be understood to be explicitly included in the description.

In addition, as to each term used it should be understood that unless its utilization in this application is inconsistent with such interpretation, common dictionary definitions should be understood to included in the description for each term or element as contained in the Random House Webster's Unabridged Dictionary, second edition, each definition hereby incorporated by reference.

Thus, the applicant(s) should be understood to claim at least: i) each of the anchors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An anchor, comprising:
   a cylindrical member having a longitudinal axis which passes through a member first end and a member second end;
   a helical thread coupled to said cylindrical member; and
   a tether restraint element coupled proximate said member second end, said tether restraint element having a configuration adapted to guide a movably coupled tether end toward a position on said tether restraint which directs forces transmitted to said tether restraint element from said tether end in a direction which acts to rotationally advance said cylindrical member into an anchoring material.

2. The anchor as described in claim 1, wherein said tether restraint element has a spiral restraint body disposed between a restraint first end and a restraint second end, said restraint first end and said restraint second end coupled in radial spaced apart relation about said longitudinal axis of said cylindrical member proximate said second member end to dispose said spiral restraint body over said member second end.

3. The anchor as described in claim 2, further comprising a member cap coupled to said member first end, said member cap extending a distance outward of said cylindrical member to a peripheral edge, said restraint first end and said restraint second end coupled in spaced apart relation about said peripheral edge of said member cap to dispose said spiral restraint body over said member first end.

4. The anchor as described in claim 3, wherein said member cap has a substantially circular peripheral edge.

5. The anchor as described in claim 4, wherein said spiral restraint body comprises a flexible line having a spiral configuration generated by coupling of said restraint first end and said restraint second end in spaced apart relation about said peripheral edge of said member cap.

6. The anchor as described in claim 5, further comprising a pair of flanges coupled in opposed relation to said member cap proximate said peripheral edge, said pair of flanges each adapted to couple to a corresponding one of said restraint first end or said restraint second end.

7. The anchor as described in claim 6, wherein said pair of flanges are disposed in substantially orthogonal relation to said member cap, said pair of flanges each having a pair of flange surfaces disposed in opposed relation a distance apart and a bore which communicates between said pair of flange surfaces, said retainer first end or retainer second end retained within said bore.

8. The anchor as described in claim 7, further comprising a mechanical fastener adapted to retain said retainer first end or retainer second end inside of said bore.

9. The anchor as described in claim 8, wherein said first cylindrical member end terminates in a tip forcibly urged into said anchoring material to rotatingly engage said helical thread with said anchoring material.

10. The anchor as described in claim 9, further comprising a rotor receiving element coupled proximate said member second end adapted to fit a rotor, said rotor operable to rotate said cylindrical member.

11. The anchor as described in claim 10, wherein said cylindrical member further comprises a diameter "B" of between about three eights inch and about five eights inch.

12. The anchor as described in claim 11, wherein said cylindrical member diameter "B" comprises a cylindrical member diameter of about one half inch.

13. The anchor as described in claim 12 wherein said helical thread further comprises a thread pitch measure "W", wherein said thread pitch measure comprises a thread pitch measure range of between one half and about one and one-half the cylindrical member diameter "B".

14. The anchor as described in claim 13, wherein said thread pitch measure "W" comprises a thread pitch measure "W" about equal to the cylindrical member diameter "B".

15. The anchor as described in claim 14, wherein said helical thread further comprises a first helical thread surface which faces away from said external surface of said anchoring material upon engagement of said member first end with said anchoring material, and wherein said first helical thread surface has a thread angle "X" of between about eighty degrees and about ninety degrees.

16. The anchor as described in claim 15, wherein said thread angle "X" comprises a thread angle "X" of about ninety degrees.

17. The anchor as described in claim 16, wherein said helical thread further comprises a second helical thread surface which faces toward said external surface of said anchoring material upon rotational engagement of said member first end with said external surface of said anchoring material, and wherein said second helical thread surface has a thread angle "Y" of between about forty degrees and about fifty degrees.

18. The anchor as described in claim 17, wherein said thread angle "Y" comprises a thread angle "Y" of about forty five degrees.

19. The anchor as described in claim 18, wherein said helical thread has an internal thread diameter "Z" about equal to said cylindrical member diameter "B".

20. The anchor as described in claim 19, wherein said helical thread has an internal thread diameter "Z" of about one half inch.

21. The anchor as described in claim 20, wherein said helical thread has an external diameter "A" of about one half inch greater than said internal thread diameter "Z".

22. The anchor as described in claim 21, wherein said helical thread has an external diameter "A" of about one inch.

* * * * *